(12) United States Patent
Burg et al.

(10) Patent No.: US 10,184,688 B2
(45) Date of Patent: Jan. 22, 2019

(54) AIR CONDITIONING APPARATUS FOR EFFICIENT SUPPLY AIR TEMPERATURE CONTROL

(75) Inventors: Craig Michael Burg, Sussex, WI (US); Harold Mark Sindelar, Beaver Dam, WI (US)

(73) Assignee: Desert Aire Corp., Germantown, WI (US)

( * ) Notice: Subject to any disclaimer, the term of this patent is extended or adjusted under 35 U.S.C. 154(b) by 1487 days.

(21) Appl. No.: 13/338,470

(22) Filed: Dec. 28, 2011

(65) Prior Publication Data

US 2013/0167564 A1 Jul. 4, 2013

(51) Int. Cl.
*F25B 49/00* (2006.01)
*F24H 4/02* (2006.01)
*F25B 49/02* (2006.01)

(52) U.S. Cl.
CPC ............ *F24H 4/02* (2013.01); *F25B 49/027* (2013.01); *F25B 2400/0403* (2013.01); *Y02B 30/12* (2013.01)

(58) Field of Classification Search
CPC .. F25B 29/003; F25B 5/02; F25B 6/02; F25B 6/04; F24F 3/153
See application file for complete search history.

(56) References Cited

U.S. PATENT DOCUMENTS

| | | | |
|---|---|---|---|
| 3,402,564 A | 9/1968 | Nussbaum | |
| 4,193,781 A | 3/1980 | Vogel et al. | |
| 5,752,389 A | 5/1998 | Harper | |
| 6,055,818 A * | 5/2000 | Valle et al. | 62/173 |
| 6,131,402 A | 10/2000 | Mills, Jr. et al. | |
| 6,332,327 B1 * | 12/2001 | Street | F25B 49/02 236/51 |
| 6,381,970 B1 * | 5/2002 | Eber et al. | 62/90 |
| 6,666,040 B1 | 12/2003 | Groenewold et al. | |
| 6,955,057 B2 | 10/2005 | Taras et al. | |
| 7,257,955 B2 | 8/2007 | Lifson et al. | |
| 7,287,394 B2 | 10/2007 | Taras et al. | |
| 7,353,664 B2 | 4/2008 | Kim | |
| 2004/0050080 A1 * | 3/2004 | Eisenhower et al. | 62/190 |
| 2006/0086115 A1 * | 4/2006 | Weber et al. | 62/196.4 |

OTHER PUBLICATIONS

*AlpinePure Dehumidification: Hot Gas Reheat & Hot Gas Bypass Application Guide*—(12 Pages); http://www.waterfurnace.com/literature/alpinepure/AG2800.
*Commercial | Geothermal Technology; Reinventing Energy Efficiency*—(14 Pages); http://www.fhp-mfg.com/files/download/Geothermal_BR(Commercial).pdf.

(Continued)

*Primary Examiner* — Jianying Atkisson
*Assistant Examiner* — Antonio R Febles
(74) *Attorney, Agent, or Firm* — Boyle Fredrickson S.C.

(57) ABSTRACT

A system and method of controlling a multiple condenser air conditioning system that provides for efficient regulation of air temperature. The refrigeration system includes one or more valves whose operation is preferably controlled by programmable control logic to regulate flow through the refrigerant condenser(s) and sequentially control compressor discharge pressure and temperature in response to demands for heating or reheating of a supply air flow.

8 Claims, 10 Drawing Sheets

(56) References Cited

OTHER PUBLICATIONS

*TRANE Product Catalog*; "Water Source Heat Pump Axiom Horizontal/Vertical—GEH/GEV"—(116 Pages); http://www.tranehk.com/prodcat/GEHE%20GEVE/WSHP-PRC016-EN_11152010.pdf.
*ClimateMaster Water-Source Heat Pump Systems LC360*—(4 Pages) http://www.climatemaster.com/downloads/LC360.pdf.
*ClimateMaster Water-Source Heat Pump Systems LC410*—(68 Pages) http://www.climatemaster.com/downloads/LC410.pdf.
*Aaon Geothermal Heat Pump Solutions*—(4 pages) http://www.aaon.com/Documents/Featured/Geothermal_110914.pdf.
Canadian Patent Office Action and Examination Search Report dated Jan. 14, 2015; Canadian Patent Application No. 2,792,460—(4) pages.
Canadian Patent Office Action and Examination Search Report dated Jan. 18, 2016; Canadian Patent Application No. 2,792,460—(5) pages.

\* cited by examiner

AIR CONDITIONING APPARATUS FOR EFFICIENT SUPPLY AIR TEMPERATURE CONTROL

BACKGROUND OF THE INVENTION

Conventional refrigeration based heat pump systems that respond to differing requirements for air heat may vary the amount of refrigerant flowing through a condenser exposed to a supply airstream in order to manipulate the temperature of the supply air. This can be accomplished with binary or modulating valves that divert a portion or all of the high pressure gas associated with the refrigerant flow through the condenser disposed in the airstream. One or more additional condensers are commonly used to reject the thermal energy present in the bypass gas or the refrigerant gas that is diverted around the refrigerant condenser in the supply airstream.

Requirements for increasing or decreasing the temperature of the supply air may be based directly or indirectly on a condition in the room with which the conditioned air is introduced or based solely on a measurement of temperature of the supply air either before or after interaction with the air stream condenser.

Commonly, control of the supply air temperature has been accomplished by diverting the discharge gas through the refrigerant condenser that is disposed in the supply air airstream or flow path. Commonly, a three-way valve is positioned to either bypass the refrigerant flow around the refrigerant condenser coil located in the supply airstream or divert the refrigerant through the condenser. This three-way valve can be of a binary control wherein the entire refrigerant flow is directed either through the condenser or through the condenser bypass passage. Others manipulate the thermal exchange between the refrigerant flow and the supply air flow by utilization of a modulating three-way valve capable of diverting only a portion of the refrigerant flow compressor discharge gas through the refrigerant condenser disposed in the supply airstream while diverting the remainder through the bypass line.

Diverting the compressor discharge gas through the refrigerant condenser in the supply airstream may be accomplished with two-way valves located in the refrigerant lines coupled to the refrigerant condenser and located in the bypass line. As in the case of the three-way valve, these valves may be of the binary or modulating type.

Still others modulate the discharge temperature through the use of dampers that divert airstream airflow through the supply air stream condenser or bypass the condenser in the supply airstream as required to increase and/or decrease the temperature of the airstream as desired.

Those prior art systems with multiple refrigerant condensers are subject to varying compressor discharge pressures and temperatures dependant on the temperatures and flow rates of the heat transfer mediums over all refrigerant condensers disposed in the system. The varying compressor discharge pressures creates difficulty in maintaining a desired temperature of the supply air during specific conditions, particularly as the temperatures of the heat transfer mediums decrease, the flow rates of the heat transfer mediums increase, and/or the requirements for increased temperature rise in the supply air. In the case of a system or condition where higher air temperatures are desired, the heat transfer taking place in one or more of the refrigerant condensers may be undesirable if such conditions cause the refrigerant pressure and temperature to drop to a point where the refrigerant and air stream heat transfer capability are limited by the parameters of the supply air steam condenser during air stream heating demands.

Still others make use of refrigerant discharge pressure controls in order to maintain a fixed discharge pressure. If used as a means for increasing supply air temperature, the fixed discharge pressure is typically determined by the highest supply air temperature requirements associated with a given application.

The higher discharge pressure control causes increased power consumption associated with operation of the compressor motor power which in turn detrimentally affects the total operating efficiency of the underlying system. During many times when requirements for supply air temperature are lower, it is advantageous to maintain discharge pressures as low as possible to improve the overall energy efficiency of the thermal exchange system. However, doing so may conflict with the heating demand requirements associated with the supply air temperature control.

Other methods of attempting to satisfy an air conditioning demand may include provisions for additional auxiliary heating of the supply air separate from the refrigeration circuit. The inclusion of such additional auxiliary heat requires additional energy to raise the temperature of the supply air and increases the cost and complexity of the construction of the resultant system. The additional auxiliary heating also increases the total energy consumption of the system and thereby detracts from the underlying efficiency associated with operation of the system.

Although some conventional systems may also control refrigerant system discharge pressures to allow for proper function of other system valves, controls, and refrigerant compressors, such controls are commonly associated with a fixed parameter value and are commonly also detrimental to the overall efficiency associated with operation of the system.

BRIEF DESCRIPTION OF THE INVENTION

The present invention relates to an air conditioning system or apparatus and method of operation that overcomes the aforementioned drawbacks. The system addresses supply air temperature control as one of the parameters associated with efficient operation of the system during periods of supply airstream heating and cooling demands. The present invention is particularly suited where both efficiency and increased supply air temperatures that are beyond the capabilities of present systems are required.

Briefly described, the invention comprises a method for control of an air conditioning system that includes a refrigerant compressor, a refrigerant heat exchanger that is used to absorb energy from an airstream or other fluid, and a plurality of refrigerant heat exchangers used to reject the energy absorbed from the airstream or fluid and any additional energy added to the system by the compression of refrigerant gas and/or the various systems associated with moving the refrigerant and the airstream through the system. A refrigerant heat exchanger is used to reject the absorbed energy and is exposed to the supply airstream. A fan or blower is used to move air through the refrigerant condenser located in the supply airstream. The system includes means for controlling the rate of heat exchange of the condenser that is located in the supply airstream. Additionally, a method is used to manipulate the pressure and temperature of the refrigerant compressor discharge gas. Additional components or heat exchangers may also be included in the airstream to allow for specific conditions refrigerant or airstream conditions to exist for reasons other than to increase airstream temperature.

The present invention preferably utilizes control logic to sequentially control the optimal path or rate for refrigerant flow and compressor discharge pressure based on the desired supply air temperature condition. Programmable control logic is used to interpret a control signal from one or more temperature sensors to determine the requirement for supply air temperature to satisfy a particular demand. These sensors may be located within the supply air flow or within the space conditioned by the supply air. The air temperature measured by said sensor or plurality of sensors is interpreted by the programmable logic controller to represent a process variable that is compared to a desired process setpoint.

When the process variable is below the process setpoint, the programmable control logic enters a first stage of operation in which the output of said controller commands the means of control of the compressor discharge gas flow to a position that increases the flow of the compressor discharge gas to the refrigerant condenser in the supply airstream, therefore raising the temperature of the airstream. When the process variable is above the process setpoint, the programmable control logic commands the valve or valves used to divert compressor discharge gas to a position that decreases the flow of said compressor discharge gas to the refrigerant condenser in the supply airstream, therefore lowering the temperature of the airstream.

During this first stage of operation, the method that is used to increase the pressure and temperature of the refrigerant compressor discharge gas is inoperable as not to increase the discharge pressure of the refrigerant compressor and hence increase the compressor motor power consumption.

As the means of control of the compressor discharge gas flow used to divert the refrigerant to the refrigerant condenser located in the supply airstream approaches a position where all of the compressor discharge gas flows through the refrigerant condenser located in the supply airstream, and the process variable remains below the desired process setpoint, an additional or second stage of operation commences. During the second operating stage, the valve used to increase compressor discharge pressure is controlled by the process variable while the valve or valves used to divert compressor discharge gas to a position that increases the flow of said compressor discharge gas to the refrigerant condenser in the supply airstream remain fixed in the position that diverts maximum flow of the compressor discharge gas through the refrigerant condenser located in the supply airstream. In this mode, when the process variable is below the process setpoint, the programmable control logic commands the valve used to increase compressor discharge pressure to a position that increases the pressure and temperature of the compressor discharge gas, therefore raising the temperature of said airstream. When the process variable is above the process setpoint, the programmable control logic commands the valve used to increase compressor discharge pressure to a position that decreases the pressure and temperature of the compressor discharge gas, thereby lowering the temperature of the airstream.

Should the sensed pressure at the refrigerant compressor exceed the operating limits of the compressor, the valve used to increase compressor discharge pressure is manipulated to a position that decreases the pressure. This limit of compressor discharge operating pressure and corresponding action preferably takes precedence over other operation.

During this stage of operation, should the valve used to increase compressor discharge pressure be commanded to a position of substantially unimpeded flow that does not increase the compressor discharge pressure, the unit terminates this stage of operation and reverts to the first stage of operation.

The invention may be more fully understood by reference to the following drawings.

BRIEF DESCRIPTION OF THE DRAWINGS

The disclosed drawings are for illustrative purposes only. The invention is not limited to the embodiments shown.

In describing the preferred embodiments of the invention, which are illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION OF THE PREFERRED EMBODIMENT

The method of control of supply air temperature is detailed in order for those skilled in the art to practice the invention with each of the various conditioning systems disclosed herein. The method, apparatus, and alternate embodiments disclosed herein exemplify the preferred embodiments of the invention. It is appreciated that the method and apparatus may be changed from that which is shown in the drawings without departing from the scope of the invention, which is defined by the claims.

Figure 1:
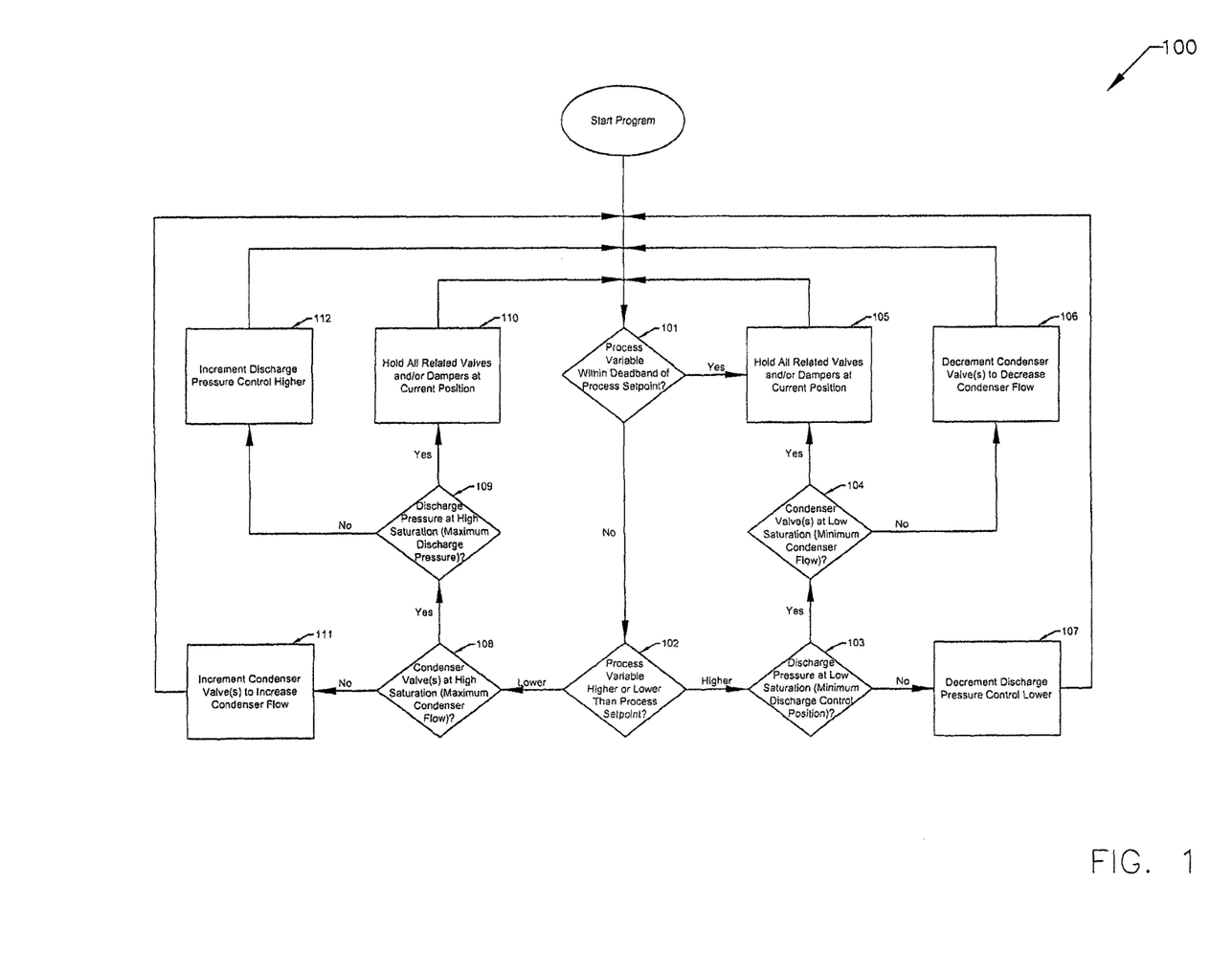
FIG. 1 is a block diagram showing a method of operation of the various embodiments of the systems as described hereafter.

FIG. 1 is a graphic representation of the control logic associated with operation of the various conditioning systems disclosed herein and indicates the control logic for the method of control. Those skilled in the art will recognize the disclosed method of operation as control consisting of discrete stages wherein the first stage of operation comprises control of the heat exchange of the condenser located in the supply airstream by means of the respective fluid flow control. Those skilled in the art will also recognize that a second stage of operation manipulates a compressed discharge pressure associated with of the refrigerant loop, thereby manipulating the temperature of the refrigerant.

As described further below, the first stage of control is carried out through methods that increase or decrease the thermal transfer to the supply airstream through control of heat transfer at the condenser located in the supply airstream. The second stage of control is carried out through the use of methods that increase or decrease the thermal transfer at one or more condensers that are not located in the supply airstream and therefore manipulate the pressure associated with operation of the refrigerant flow compressor. Alternatively, the condenser pressure may be increased directly through control of a restriction in the refrigeration circuit.

As shown in FIG. 1, at start of method 100, decision block in step 101 is entered. An input is assessed to determine if a process variable, such as airstream temperature, refrigerant pressure, etc., is within a deadband range of a desired value or process set point. If the value is within the deadband range, method 100 maintains the current setting of one or more flow controls per process block in step 105. If the value does not satisfy the deadband range, step 102 assesses whether the assessed value is higher or lower than a process setpoint. Understandably, the process variable being equal to a proscribed set point could be assessed as being either within the acceptable or deadband range or an unacceptable value necessitating appropriate reaction.

If the variable in step 102 is higher than a given process set point, step 103 assesses whether the discharge pressure is at the minimum discharge pressure control position. If the means for control of the discharge pressure is not at the minimum position, step 107 commands the means for control of discharge pressure to affect a lower discharge pressure. Subsequent to this command, method 100 returns to decision block 101. If the means for control of the discharge pressure is at the minimum position, the step 104 determines if the means for control of the flow through the condenser is at the minimum position.

Should step 104 determine the means for control of the flow through the condenser is at the minimum position, step 105 commands all affected components to maintain current operation and returns to decision block 101. Should step 104 determine that the means for control of flow through the condenser is not at minimum position, step 106 will adjust the means for control of flow through the condenser in a manner such to decrease the flow. The method 100 then returns to step 101.

If the variable in step 102 is lower than a given process set point, step 108 assesses the means for control of flow through the condenser is at the maximum position. If the means for control of flow through the condenser is not at the minimum position, step 111 commands the means for control of flow through the condenser to affect an increase in flow through the condenser. Subsequent to this command, method 100 returns to decision block 101. If the means for control of flow through the condenser is at the minimum position, the step 109 determines if the means for control of the discharge pressure is at the maximum position.

Should step 109 determine the means for control of the discharge pressure is at the maximum position, step 110 commands all affected components to maintain current operation and returns to decision block 101. Should step 109 determine that the means for control of the discharge pressure is not at the maximum position, step 112 will adjust the means for control of the discharge pressure in a manner such to increase the pressure. The method 100 then returns to step 101.

Figure 2:
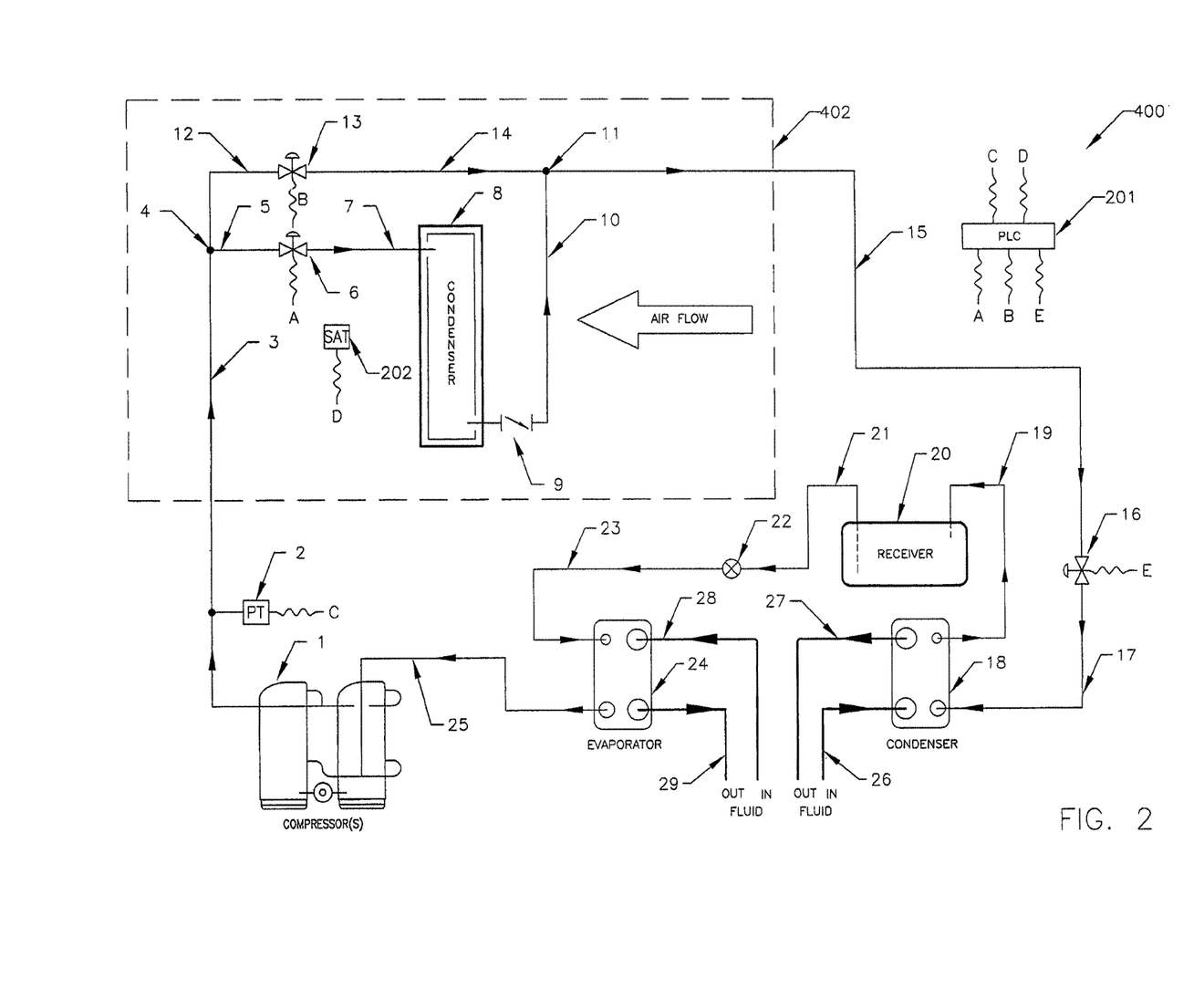
FIG. 2 is a schematic representation of a first embodiment of the system capable of the operation shown in FIG. 1 and includes bypass and diverting valves at a condenser coil located in the supply airstream and a valve used for control of compressor discharge pressure with condensers in series.

FIG. 2 exemplifies a schematic representation of one embodiment of an air conditioning system or apparatus 400 that is operable in accordance with method 100. As explained further below, apparatus 400 includes a refrigeration circuit whereby the first stage of operation is carried out by diverting refrigerant through or bypassing the condenser coil located in the supply airstream and the second stage of operation is carried out by manipulating or controlling the pressure of the discharge gas at the compressor.

Referring to the details of flow arrangements in FIG. 2, a refrigerant compressor or plurality of compressors 1 increases pressure of the vapor refrigerant and thereby the temperature of said refrigerant and creates forces that circulate the refrigerant throughout the system. A pressure sensing device 2 is operationally connected to the discharge path 3 from compressor 1 and is used to sense the discharge pressure from compressor 1 associated with the refrigerant flow. It is appreciated that sensing device 2 may be located at any point in the system and is preferably positioned prior to an expansion valve. The discharge port of compressor(s) 1 fluidly communicates via conduit 3 with conduit 5 and conduit 12 via a junction 4 in the conduits. The ratio of refrigerant vapor diverted through each conduit is related to the position of valve 6 and valve 13. The valves are preferably controlled by a programmable logic controller (PLC) 201 or other such control device such that more restriction to flow is created at valve 13, less restriction is placed on valve 6, or a combination of such actions take place as to divert refrigerant vapor to the condenser coil 8 located in the supply airstream upon an increase in requirement or demand for supply air temperature as assessed at a sensor 202. It is appreciated that PLC or other control system can be electrically connected to valves 6, 13 or otherwise configured to wirelessly communicate therewith.

Conversely, the valves are controlled by a programmable logic controller or other such control device such that less restriction to flow is created at valve 13, more restriction is placed on valve 6, or a combination of such actions take place as to divert refrigerant vapor through conduit 14 upon a decrease in requirement or demand for supply air temperature. It is further appreciated that although valves 6 and 13 are schematically represented as modulating valves, one or both of the valves may be binary controlled, manual valves, or spring loaded restrictions such that diverting or bypass of vapor refrigerant is accomplished to the effect of controls over refrigerant flow through the conduits as previously described.

Refrigerant vapor diverted through valve 6 flows through conduit 7. Conduit 7 fluidly communicates with the condenser coil located in the supply airstream. Whereas the temperature of the airflow is lower than the temperature of the vapor refrigerant, energy in the form of heat is transferred from the refrigerant vapor into the airstream as the refrigerant vapor and air flow through the condenser coil. Depending on the temperature and flow rate of the refrigerant and the temperature and flow rate of the airstream, the vapor refrigerant may become partially or fully condensed to liquid.

The refrigerant exiting the condenser flows through an optional check valve 9. The valve 9 is not a required component of the present invention, but may provide advantages to specific intended functions of the device. This valve fluidly communicates with the junction at point 11. The combined flow of refrigerant from conduit 10 and conduit 14 are combined at junction 11 and fluidly communicate with valve 16 via conduit 15. The operation of valve 16 comprises a second stage of operation or second operating stage of the method whereas the valve closes mechanically or electromechanically in response to demand for increase in supply air temperature therefore increasing the pressure and temperature of the vapor refrigerant at the compressor discharge. Conversely, valve 16 opens mechanically or electromechanically in response to demand for decrease in supply air temperature decreasing the pressure and temperature of the vapor refrigerant at the compressor discharge. Valve 16 maintains a substantially full open position until such time as the valves located at 6 and 13 are positioned to divert substantially all of the refrigerant vapor discharged from the compressor through the condenser 8.

The position of valve 16 relative to the refrigeration circuit loop is representative of a typical embodiment of the present invention. It is appreciated that valve 16 may be located at several positions within the system as to restrict refrigeration flow within the system and create a greater pressure at the outlet of the compressor or plurality of compressors.

The outlet of valve 16 fluidly communicates with a refrigerant condenser or a second condenser 18 through conduit 17. Condenser 18 is a heat exchanger that allows heat transfer with a separate heat transfer fluid entering the condenser at conduit 26 and exiting at conduit 27. The direction of heat transfer fluid flow relative to the refrigerant flow is shown schematically parallel to the direction of refrigerant flow. In practice, the direction of heat exchange fluid flow can be changed to suit the particular thermal demands of the refrigerant system without departing from the invention. It is further appreciated that the heat exchange fluid may comprise water, glycol, brine, or other fluid. Those skilled in the art will also recognize that this heat exchanger may also be configured to transfer heat between the refrigerant circuit and an airstream.

The refrigerant exiting condenser 18 is cooled below the saturation temperature for the corresponding pressure of the refrigerant and is therefore in liquid state. The outlet of condenser 18 fluidly communicates with the inlet of receiver 20 via conduit 19. The outlet of the receiver fluidly communicates with valve 22 via conduit 21. The receiver is an optional component that may increase the system efficiency by storage of liquid refrigerant during specific conditions and is not directly related to practice of the method or apparatus.

Valve 22 is a restrictor used as an expansion device that reduces the pressure of the refrigerant from the inlet of said valve to the outlet of said valve. In such, the refrigerant pressure and temperature will be reduced below the saturation temperature of the refrigerant and a portion of the liquid refrigerant will be vaporized at the outlet of valve 22. The outlet of valve 22 fluidly communicates with evaporator 24 via conduit 23. Evaporator 23 is a heat exchanger that allows heat transfer with a separate heat transfer fluid entering the evaporator at conduit 28 and exiting at conduit 29. The direction of heat transfer fluid flow relative to the refrigerant flow is shown schematically parallel to the direction of refrigerant flow. In practice, the direction of heat exchange fluid flow can be changed to suit the configuration of the system and/or the desired thermal exchange parameters without departing from the present invention. It is appreciated that the fluid associated with the thermal exchange associated with evaporator 24 may comprise water, glycol, brine, or any other suitable fluid. Those skilled in the art will also recognize that this heat exchanger may also be configured to transfer heat between the refrigerant circuit and an airstream.

The temperature of the heat exchange fluid at conduit 28 is at a higher temperature than the temperature of the refrigerant at conduit 23. Energy is transferred between the respective fluid and the refrigerant fluid such that all or substantially all of the refrigerant flow directed to compressor inlet conduit 25 is vaporized. The refrigerant vapor exiting the evaporator 18 fluidly communicates with the inlet of the compressor 1 or a plurality of compressors via conduit 25.

Figure 2A:
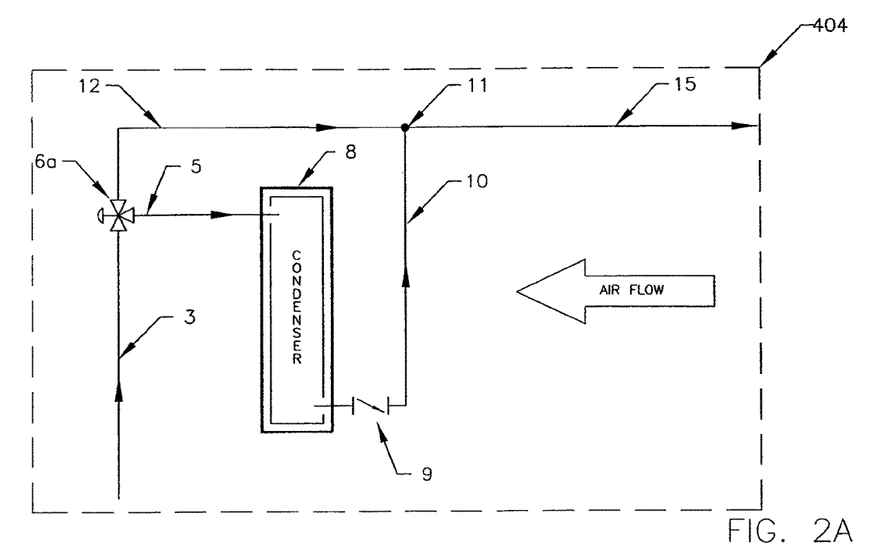
FIG. 2A is a partial schematic representation of an airstream condenser according to another embodiment of the invention and usable with the remainder of the system shown in FIG. 2 and includes a three-way valve at the junction of the condenser coil located in the supply airstream and bypass line.

FIG. 2A is a schematic view showing an alternate form of the air stream/refrigerant condenser 402 that is useable with the remainder of the air conditioning system shown in FIG. 2. For clarity, like reference numbers are used in FIGS. 2-2B and indicate the similar components of the respective systems. Air stream condenser system 404 shown in FIG. 2A includes a three-way valve 6a at the junction of conduit 5 and conduit 12. The system operates as in FIG. 2 with the ratio of refrigerant vapor diverted through each conduit being related to the position of valve 6a. The valve is controlled by a programmable logic controller or other such control device such that more refrigerant vapor flow is diverted to the condenser coil 8 via conduit 5 upon an increase in requirement or demand for supply air temperature. Conversely, the valve 6a is controlled by a programmable logic controller or other such control device such that less refrigerant vapor flow is diverted to the condenser coil 8 via conduit 5 upon an increase in requirement or demand for supply air temperature. Like FIG. 2, the symbology of the valve 6a in FIG. 2A is typical of a modulating valve but it is appreciated that 6a may be binary controlled valve. Those skilled in the art will also recognize that the three-way valve may be located as to replace junction 11 in a so-called mixing valve configuration.

The alternate form of construction of the airstream/refrigerant condenser 404 described in FIG. 2A relates to the first stage of operation of the invention and may be utilized as one embodiment in combination with other forms of operation related to the second stage of operation to practice the method as described above.

Figure 2B:
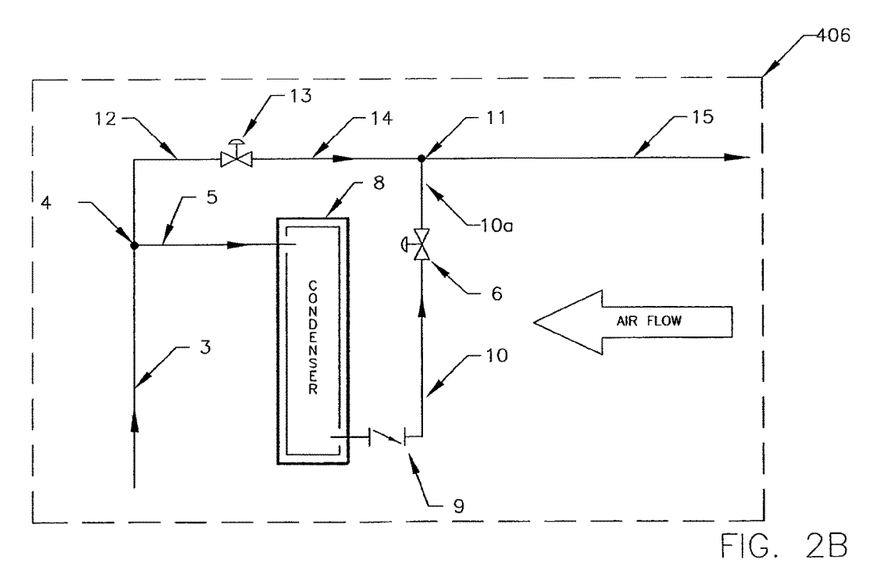
FIG. 2B is a partial schematic representation of an airstream condenser according to another embodiment of the invention and usable with the remainder of the system shown in FIG. 2 and includes a valve coupled to the outlet of the condenser coil located in the supply airstream.

FIG. 2B shows another airstream/refrigerant condenser 406 similar to that shown in FIG. 2A that is usable with the remainder of the air conditioning system shown in FIG. 2 as an alternative to either of airstream/refrigerant condensers 402, 404. As shown in FIG. 2B, airstream/refrigerant condenser 406 includes a valve coupled to the outlet of the condenser coil located in the supply airstream. The system operates as in FIG. 2 with the ratio of refrigerant vapor diverted through each conduit being related to the position of valve 6 and valve 13. In FIG. 2B, the discharge port of the compressor(s) 1 fluidly communicates via conduit 3 with conduit 5 and conduit 12 via a junction in conduits at 4. The ratio of refrigerant vapor diverted through each conduit is related to the position of valve 6 and valve 13. The valves are controlled by a programmable logic controller or other such control device such that more restriction to flow is created at valve 13, less restriction is placed on valve 6, or a combination of such actions take place as to divert refrigerant vapor to the condenser coil located in the supply airstream upon an increase in requirement or demand for supply air temperature. Conversely, the valves are controlled by a programmable logic controller or other such control device such that less restriction to flow is created at valve 13, more restriction is placed on valve 6, or a combination of such actions take place as to divert refrigerant vapor through conduit 14 upon a decrease in requirement or demand for supply air temperature. The outlet of valve 6 fluidly communicates with the junction at 11 via conduit 10a.

Like FIGS. 2 and 2A, the symbology of the valve 6 and valve 13 in the schematic view shown in FIG. 2B are typical to modulating valves but it is appreciated that one or both of the valves may be binary controlled, manual valves, or spring loaded restrictions such that diverting or bypass of vapor refrigerant is accomplished to the effect of controls over refrigerant flow through the respective conduits as previously disclosed.

The alternate form of construction airstream/refrigerant condenser system 406 described with respect to FIG. 2B relates to the first stage of operation of the invention and may be utilized as one embodiment in combination with other forms of operation related to the second stage of operation to practice the method described.

Figure 2C:
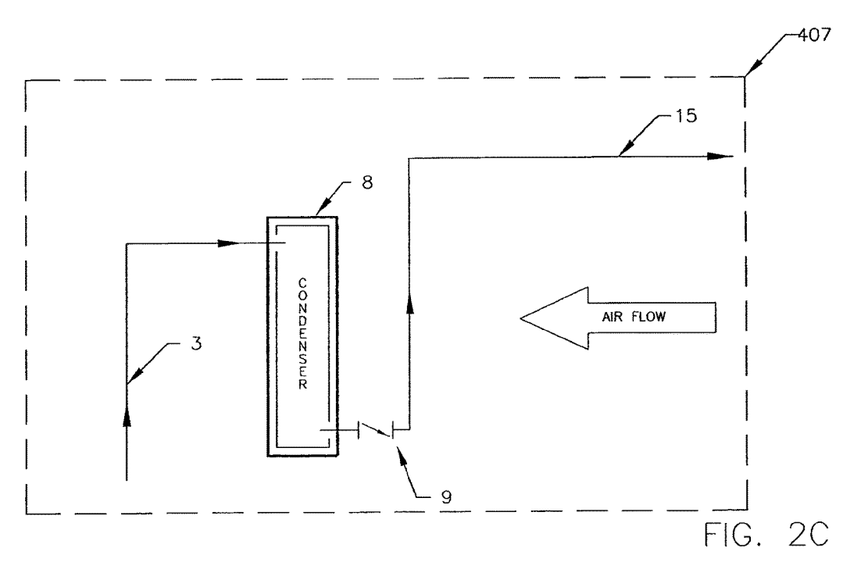
FIG. 2C is a partial schematic representation of an airstream condenser according to another embodiment of the invention and usable with the remainder of the system shown in FIG. 2.

FIG. 2C shows another airstream/refrigerant condenser 407 similar to that shown in FIG. 2B that is usable with the remainder of the air conditioning system shown in FIG. 2 as an alternative to either of airstream/refrigerant condensers 402, 404, 406. As shown in FIG. 2C, airstream/refrigerant condenser 407 is coupled to the discharge of the compressor 1. The system operates as in FIG. 2 with flow rate of refrigerant to affect the heat transfer being controlled by the operation of the compressor. In FIG. 2C, the discharge port of the compressor(s) 1 fluidly communicates via conduit 3 with the inlet of the condenser. The outlet of the condenser fluidly communicates via conduit 15 with the remainder of the system. The means of control of the flow rate is controlled by a programmable logic controller or other such control device such that that flow rate increases upon an increase in requirement or demand for supply air temperature. Conversely, the means of control of the flow rate is controlled by a programmable logic controller or other such control device such that rate decreases upon a decrease in requirement or demand for supply air temperature.

The means for control of the flow rate may include variable speed operation of the compressor, cycling the motor of the compressor, bypass of refrigerant internal to the compressor and/or through external piping among other methods.

The alternate form of construction airstream/refrigerant condenser system 407 described with respect to FIG. 2C relates to the first stage of operation of the invention and may be utilized as one embodiment in combination with other forms of operation related to the second stage of operation to practice the method described.

Figure 3:
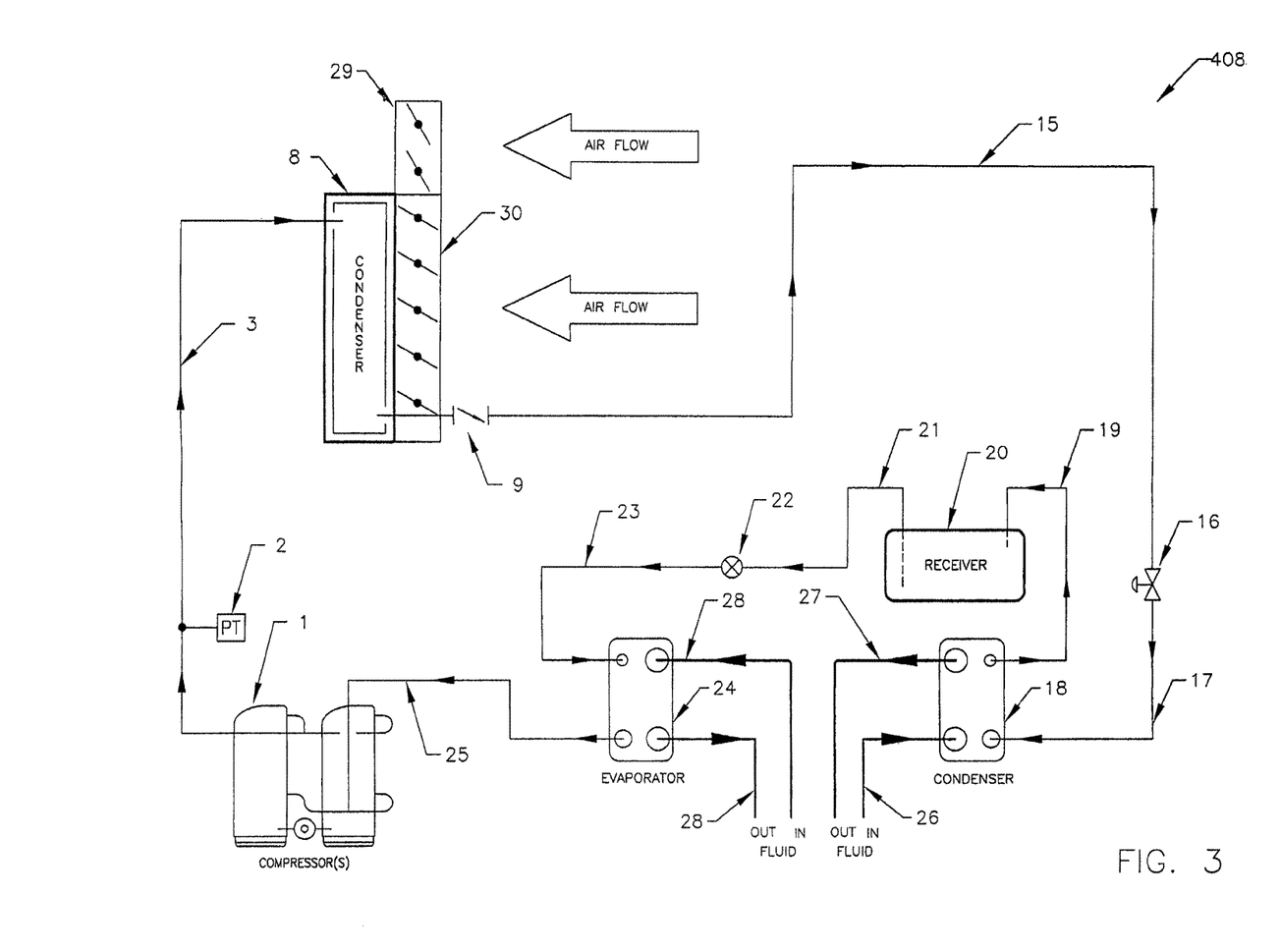
FIG. 3 is a schematic representation similar to FIG. 2 of another embodiment of the invention and includes a face and bypass damper at the inlet airflow of the condenser coil located in the supply airstream and a valve used for control of compressor discharge pressure.

FIG. 3 is system schematic view of apparatus 408 showing an alternate form of construction including a face and bypass damper at the inlet airflow side of the condenser coil located in the supply airstream and a valve used for control of compressor discharge pressure. The system operates in a manner similar to that described above with respect to FIG. 2 with the compressor or plurality of compressors 1 in fluid communication via conduit 3 with the condenser 8. The refrigerant exiting the condenser 8 flows through an optional check valve 9 which fluidly communicates with valve 16 through conduit 15.

Heat is transferred from the refrigerant vapor to the airstream by the condenser 8. A damper 30 is situated in the airstream to control the airflow through said condenser. An additional condenser 29 may be positioned to further control and divert air to bypass said condenser.

The ratio of airflow through each damper 29 and 30 is related to the position of said dampers. The dampers are controlled by a programmable logic controller or other such control device such that more restriction to airflow is created at damper 29, less restriction is placed on damper 30, or a combination of such actions take place as to divert airflow to the condenser 8 upon an increase in requirement for supply air temperature. Conversely, the dampers are controlled by a programmable logic controller or other such control device such that less restriction to flow is created at damper 29, more restriction is placed on damper 30, or a combination of such actions take place as to divert less airflow through the condenser 8 upon a decrease in requirement for supply air temperature.

The alternate form of construction described in FIG. 3 relates to the first stage of operation of the invention and may be utilized as one embodiment in combination with other forms related to the second stage of operation to practice the method as previously described.

Figure 4:
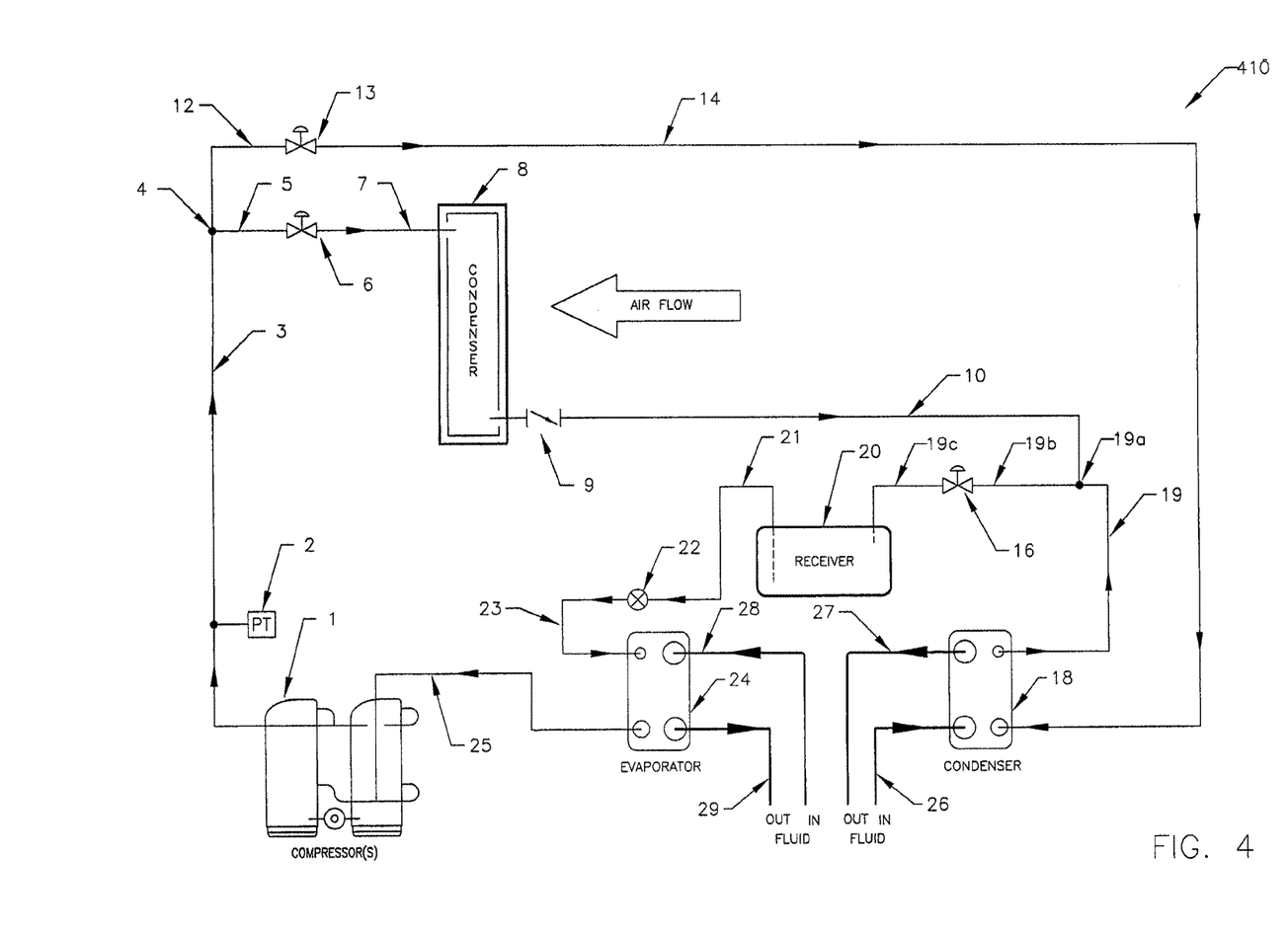
FIG. 4 is a schematic representation similar to FIGS. 2 and 3 and shows another air conditioning system that includes bypass and diverting valves at the condenser coil located in the supply airstream and a valve used for control of compressor discharge pressure with condensers in parallel.

FIG. 4 is a system schematic of apparatus 410 showing a form of construction including bypass and diverting valves at the condenser coil located in the supply airstream and a valve used for control of compressor discharge pressure with condensers in parallel. The system operates as in FIG. 2 with the outlet of valve 13 in fluid communication with condenser 18 via conduit 14. The refrigerant at the outlet of the condenser 8 flows through optional check valve 9 and fluidly communicates with the junction 19a via conduit 10. The outlet of condenser 18 also communicates with the junction 19a. Refrigerant fluid flows from condenser 8 via conduit 10, joins fluid flow via conduit 19, and is directed to inlet of valve 16 via conduit 19b. The junction 19b fluidly communicates with the receiver 20 via conduit 19c.

The alternate form of construction described in FIG. 4 relates to a modified form of the invention and may be utilized as one embodiment in combination with other forms to practice the method described.

Figure 5:
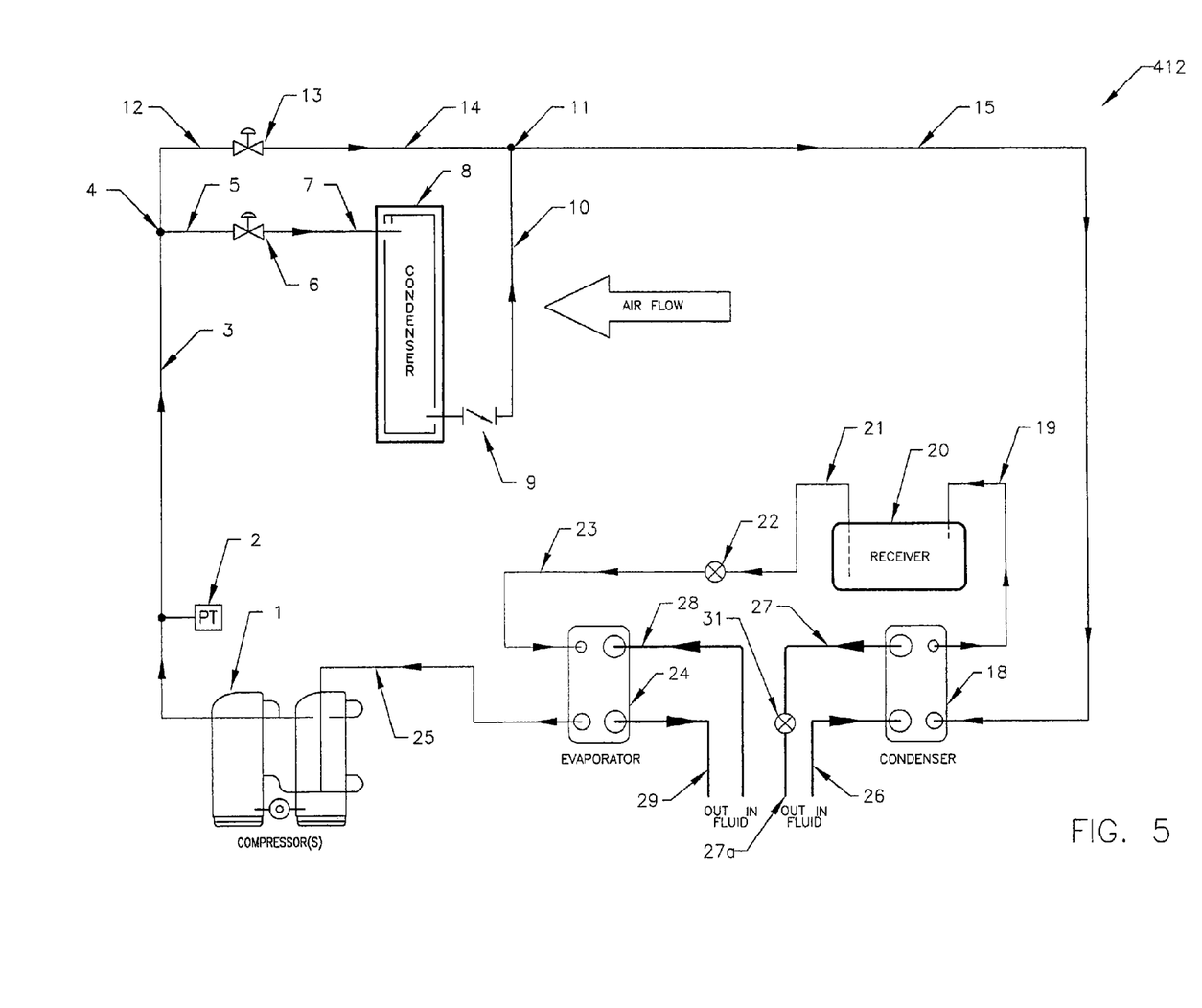
FIG. 5 is a schematic representation similar to FIGS. 2, 3, and 4 of an air conditioning system according to another embodiment of the invention that includes valves at the condenser coil located in the supply airstream and a valve used to increase discharge pressure located on the condenser water or refrigerant loop.

FIG. 5 is a system schematic of apparatus 412 showing a form of construction including valves at the condenser coil located in the supply airstream and a valve used to increase discharge pressure located on the condenser fluid or refrigerant loop. The system operates in a manner similar to that described above with respect to FIG. 2 and includes a post airstream/refrigerant condenser junction 11 that is in fluid communication with condenser 18 via conduit 15.

Heat transfer fluid flows to the inlet of condenser 18 via conduit 26. The outlet of the condenser fluidly communicates with valve 31 via conduit 27. The operation of valve 31 comprises a second stage of the method whereas the valve closes mechanically or electromechanically in response to demand for increase in supply air temperature therefore increasing the pressure and temperature of the vapor refrigerant at the compressor discharge. Conversely, valve 31 opens mechanically or electromechanically in response to demand for decrease in supply air temperature thereby decreasing the pressure and temperature of the vapor refrigerant at the compressor discharge. Valve 31 maintains a substantially full open position until such time as the valves located at 6 and 13 are positioned to divert substantially all of the refrigerant vapor discharged from the compressor through the condenser 8.

The position of valve 31 is representative of a typical embodiment. The valve may be located in several positions within the system as to restrict flow of the heat transfer fluid and create a greater pressure at the outlet of the compressor or plurality of compressors. Alternate methods such as variable speed pumps may also be used to control flow rate of the heat transfer fluid without departing from the spirit of the invention.

Those skilled in the art will recognize that this heat exchanger may also be configured as to transfer heat between the refrigerant circuit and an airstream whereas the heat transfer fluid comprises the airflow and control over heat transfer accomplished by controlling the airflow rate. Control may be accomplished by use of variable speed fans, dampers, or other methods of control over the rate of air flow.

The alternate form of construction described in FIG. 5 relates to the second mode of operation of the invention and may be utilized as one embodiment in combination with other forms related to the first stage of operation to practice the method described.

Figure 6:
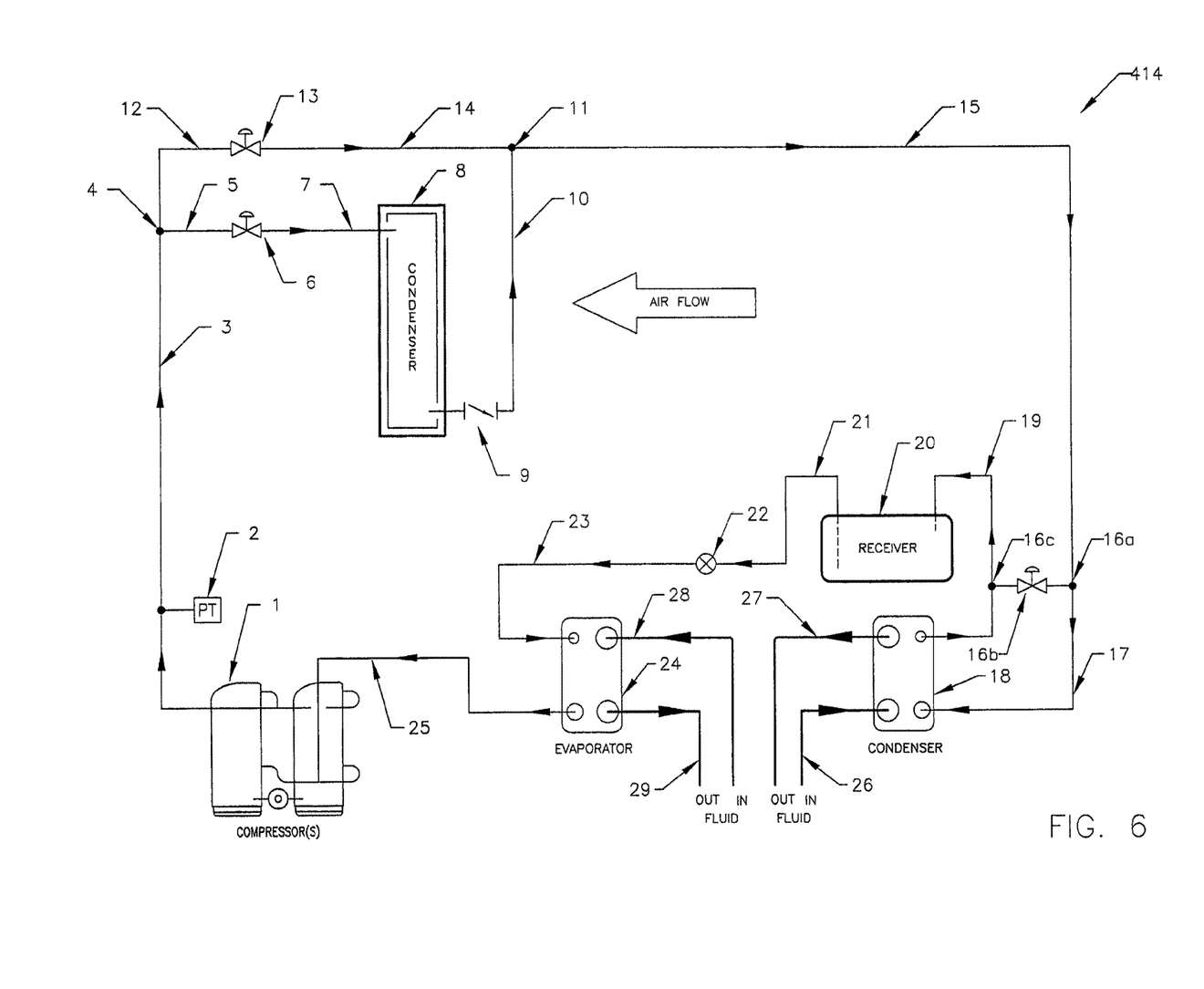
FIG. 6 is a schematic representation similar to FIGS. 2-5 of an air conditioning system according to another embodiment of the invention that includes valves at the condenser coil located in the supply airstream and a valve used to bypass refrigerant around the second condenser to increase discharge pressure.

FIG. 6 is a system schematic of apparatus 408 showing a form of construction including valves at the condenser coil located in the supply airstream and a valve used to bypass refrigerant around the second condenser to increase discharge pressure. The system operates as in FIG. 2 with the ratio of refrigerant vapor diverted through each conduit is related to the position of valve 6 and valve 13. The junction 11 fluidly communicates with the junction 16a. Junction 16a fluidly communicates with valve 16b and condenser 18. The ratio of refrigerant vapor diverted through each conduit is related to the position of valve 16b. The valve 16b and condenser 18 fluidly communicate with junction 16c.

Figure 7:
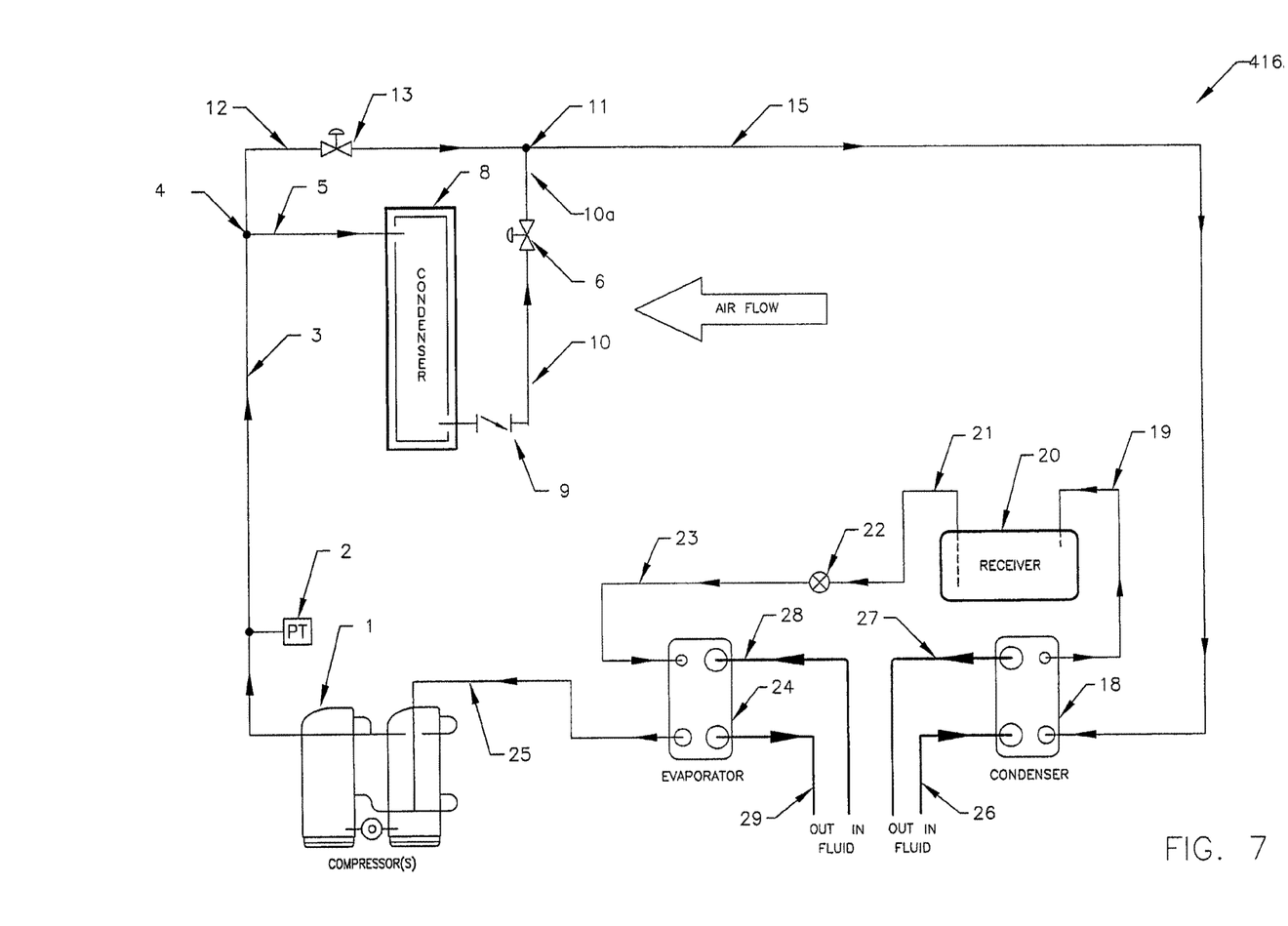
FIG. 7 is a schematic representation similar to FIGS. 2-6 of an air conditioning system according to another embodiment of the invention that includes a valve coupled to the outlet of the condenser coil located in the supply airstream that is used for both control of flow through the condenser coil located in the supply airstream and control of discharge pressure.

FIG. 7 is a system schematic of apparatus 416 showing a form of construction including a valve coupled to the outlet of the condenser coil located in the supply airstream and used for both control of flow through the condenser coil located in the supply airstream and control of discharge pressure. The system operates in a manner similar to that described above with respect to FIG. 2 with the ratio of refrigerant vapor diverted through each conduit being related to the position of valve 6 and valve 13.

As shown in FIG. 7, the discharge port of the compressor(s) 1 fluidly communicates via conduit 3 with conduit 5 and conduit 12 via a junction 4. The ratio of refrigerant vapor diverted through each conduit is related to the position of respective valves 6 and 13. The valves are controlled by a programmable logic controller or other such control device such that more restriction to flow is created at valve 13, less restriction is placed on valve 6, or a combination of such actions take place as to divert refrigerant vapor to the condenser coil located in the supply airstream upon an increase in requirement for supply air temperature. Conversely, the valves are controlled by a programmable logic controller or other such control device such that less restriction to flow is created at valve 13, more restriction is placed on valve 6, or a combination of such actions take place to divert refrigerant vapor through conduit 14 upon a decrease in requirement of demand for supply air temperature. The outlet of valve 6 fluidly communicates with the junction at 11 via conduit 10a. The junction at 11 fluidly communicates with the inlet of the condenser 18 via conduit 15. Such operation comprises a first stage of operation.

Upon a further increase in requirement for supply air temperature than can be obtained via the first stage of operation described above, valve 6 indexes to a more closed position while maintaining the valve 13 at a substantially closed position. This operation increases the pressure at the compressor discharge port, therefore increasing the pressure and temperature of the vapor refrigerant at the compressor discharge. Such operation comprises a second stage of operation only achievable by manipulation of the discharge pressure associated with operation of the compressor.

Figure 8:
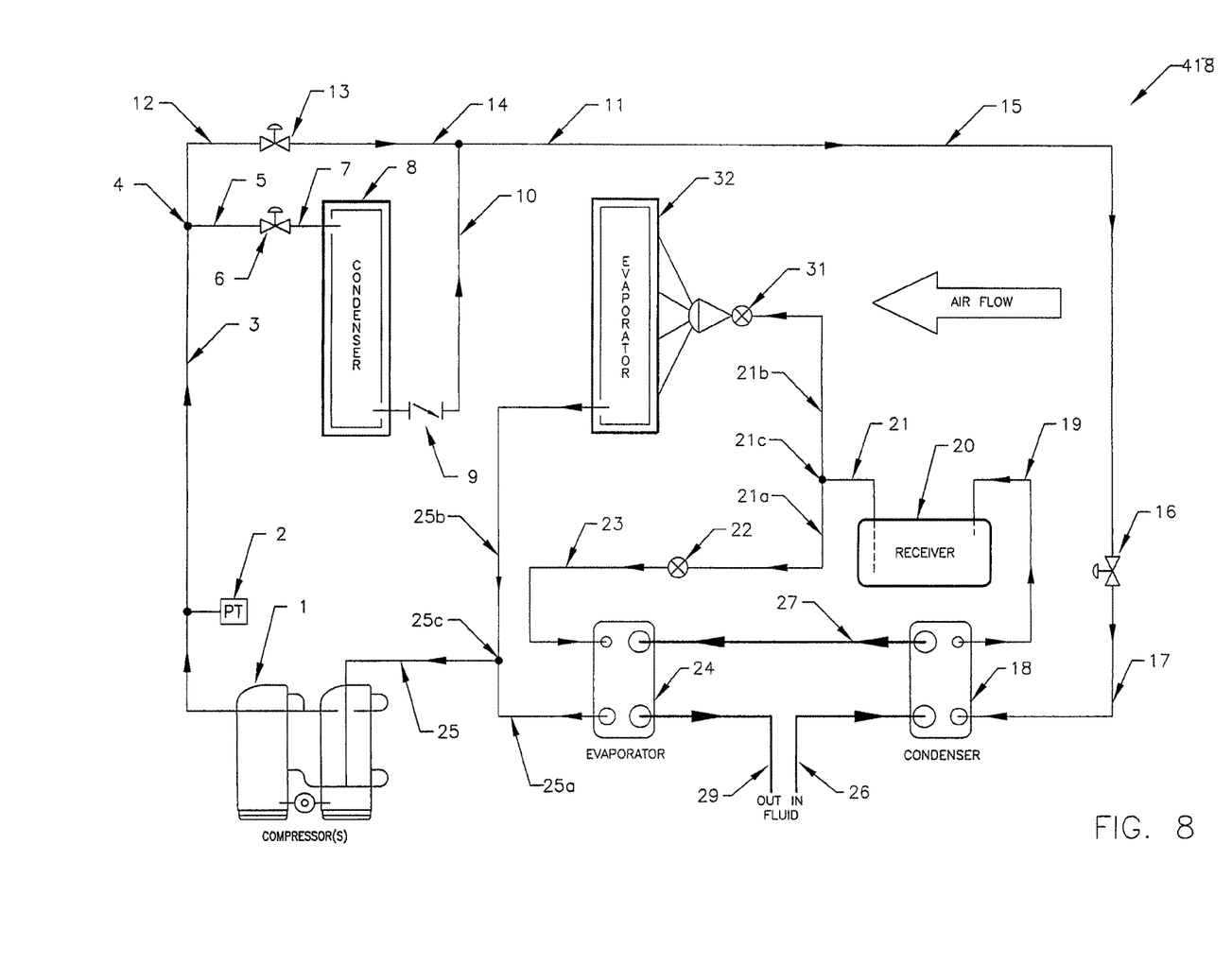
FIG. 8 is a schematic representation similar to FIGS. 2-7 of an air conditioning system according to another embodiment of the invention that includes additional components for alternate modes of operation of the underlying system.

FIG. 8 is a system schematic of apparatus 418 showing a sample form of construction including additional components for alternate modes of operation. The system operates as in FIG. 2 with the outlet of the receiver 20 in fluid communication with junction 21c. The system will operate in a mode as to close valve 31 and operate valve 22 in fluid communication with the junction 21c via conduit 21a or as to close valve 22 and operate valve 31 in fluid communication with junction 21c via conduit 21b.

When valve 22 is in communication with junction 21c the refrigerant absorbs heat from the fluid as described in FIG. 2. The refrigerant outlet of evaporator 24 is in fluid communication with junction 25c via conduit 25a. Junction 25c fluidly communicates with the inlet of the compressor via conduit 25.

When valve 31 is in communication with junction 21c the refrigerant absorbs heat from the airstream via the refrigeration process at evaporator 32 as to reduce the temperature of said airstream and condenser moisture. Airflow is routed through the condenser 8 as to reheat the air to a temperature higher than the temperature leaving evaporator 32. The refrigerant outlet of said evaporator fluidly communicates with junction 25c via conduit 25b. Junction 25c fluidly communicates with the inlet of the compressor via conduit 25.

In all descriptions, the method of controlling flow through the first condenser can include compressor operation that affects the rate of refrigerant flow directly. The means may include variable speed operation of the compressor, cycling the motor of the compressor, bypass of refrigerant internal to the compressor or through external piping among other methods.

According to the drawings and descriptions, it is appreciated that the means for controlling the heat transfer through the condenser located in the supply airstream can include one or more of one or more of each of a valve or valves used to direct refrigerant flow through the condenser, dampers used to direct air flow through the condenser, or operation of the compressor that affects the rate of refrigerant flow. It is further appreciated that the means for controlling the discharge pressure can include one or more of one or more of each of a valve or valve used to restrict refrigerant flow, reduction of heat transfer fluid flow in the second condenser, or a valve or valves used to bypass the second condenser.

Therefore, one embodiment of the invention includes a method of forming an air conditioning system that is operable in a heating mode to control a supply air temperature. The method includes providing a vapor compression system having a refrigerant compressor, an expansion device, an evaporator, a first condenser located in a supply airstream, a second condenser, means for controlling heat transfer of the first condenser, and means for controlling a discharge pressure of a refrigerant flow of the refrigerant compressor. The vapor compression system is operated with a programmable logic controller to sequentially operate the means for controlling heat transfer of the first condenser and the means for controlling refrigerant flow discharge pressure.

Another embodiment of the invention that is usable with one or more of the features of the above embodiments includes an air conditioning system having at least one refrigerant compressor with an inlet and an outlet. The system includes a first condenser that is located in a housing and means for moving an airflow through the first condenser. The system includes a second condenser, an evaporator having a refrigerant flow inlet and a refrigerant flow outlet, and a flow restrictor coupled to the refrigerant flow inlet of the evaporator. The system includes heat transfer control means that controls heat transfer of the first condenser and compressor discharge pressure control means for controlling a discharge pressure of the at least one refrigerant compressor. The system includes supply air condition sensing means for assessing a condition of a supply air flow and a programmable logic controller configured to manipulate operation of the heat transfer control means and compressor discharge pressure control means.

Another embodiment of the invention includes an air treatment system having a refrigerant compressor with an inlet and an outlet. A first condenser is located in a housing and has an airflow directed therethrough. The system includes a second condenser and an evaporator that has a refrigerant flow inlet and a refrigerant flow outlet. A restrictor is fluidly connected to the refrigerant flow inlet of the evaporator and a plurality of valves are used to control heat transfer associated with the first condenser. The system includes a compressor discharge pressure valve that is used to control a compressor discharge pressure and means for sensing a condition of a supply airflow directed through the first condenser. A programmable logic controller having a signal input and a signal output is configured to manipulate the plurality of valves and the compressor discharge pressure valve when the air treatment system is operated in a heating operation mode. The system includes a second evaporator having a refrigerant inlet and a refrigerant outlet and a refrigerant flow restrictor fluidly connected to the refrigerant inlet of the second evaporator. The second evaporator is configured to dehumidify the supply airflow when the air treatment system is operated in a separate one of a dehumidification mode or a cooling mode.

Another embodiment of the invention includes a method of manipulating performance of an air conditioning system. The method includes directing an airflow and a refrigerant flow to a condenser. A bypass is provided that is configured to direct a first portion of the refrigerant flow through the condenser in thermal exchange with the airflow and a second portion of the refrigerant flow around the condenser. Operation of the bypass is manipulated as a function of both the discharge pressure of a refrigerant compressor and thermal exchange between the airflow and the second portion of the refrigerant flow.

The present invention has been described in terms of the preferred embodiments, and it is recognized that equivalents, alternatives, and modifications, aside from those expressly stated, are possible and within the scope of the appending claims. It is further appreciated that although various embodiments of the proposed systems are disclosed herein, that various features and/or aspects of the various embodiments are combinable and/or usable together.

What is claimed is:

1. An air conditioning system comprising:
   at least one refrigerant compressor having an inlet and an outlet;
   a housing;
   a first condenser located in the housing;
   means for moving an airflow through the first condenser;
   a second condenser;
   an evaporator having a refrigerant flow inlet and a refrigerant flow outlet;
   a flow restrictor coupled to the refrigerant flow inlet of the evaporator;
   heat transfer control means for controlling heat transfer of the first condenser;
   compressor discharge pressure control means for controlling a discharge pressure of the at least one refrigerant compressor;
   supply air condition sensing means for assessing a condition of a supply air flow; and
   a programmable logic controller configured to manipulate operation of the heat transfer control means and compressor discharge pressure control means to sequentially control at least one of an optimal path and a rate of the refrigerant flow based on the discharge pressure of the at least one refrigerant compressor and a desired temperature condition associated with the supply air flow and such that instructions based on the discharge pressure of the at least one refrigerant compressor take precedent over instructions associated with the desired temperature condition associated with the supply air flow such that the discharge pressure of the at least one refrigerant compressor is maintained at a respective minimum discharge pressure to achieve the desired temperature condition of the supplied airflow.

2. The system in claim 1, wherein said heat transfer control means is configured to manipulate a flow of refrigerant through the first condenser in response to instructions from the programmable logic controller.

3. The system in claim 1, wherein said heat transfer control means is configured to manipulate at least one damper to direct an airflow through the first condenser.

4. The system in claim 1, wherein the compressor discharge pressure control means includes a valve used to restrict flow of refrigerant and is configured to direct at least one of an airflow and a fluid flow through the second condenser.

5. The system in claim 1, wherein the compressor discharge pressure control means is configured to manipulate a flow of refrigerant through the second condenser.

6. The method in claim 1, wherein the programmable logic controller manipulates the heat transfer control means and the compressor discharge pressure control means to increase total efficiency of operation of the air conditioning system.

7. The method in claim 1, wherein the programmable logic controller manipulates the heat transfer control means and the compressor discharge pressure control means to increase supply air temperature.

8. An air treatment system comprising:
a refrigerant compressor having an inlet and an outlet;
a housing;
a first condenser located in the housing and having an airflow directed therethrough;
a second condenser;
an evaporator having a refrigerant flow inlet and a refrigerant flow outlet;
a restrictor fluidly connected to the refrigerant flow inlet of said evaporator;
a plurality of valves used to control heat transfer of the first condenser;
a compressor discharge pressure valve used to control a compressor discharge pressure;
means for sensing a condition of a supply airflow directed through the first condenser;
a programmable logic controller having a signal input and a signal output that is configured to manipulate the plurality of valves and the compressor discharge pressure valve when the air treatment system is operated in a heating operation mode defined by a first stage wherein all of the flow associated with operation of the refrigerant compressor is directed through the first condenser when the compressor discharge pressure is below a threshold and a temperature of the air flow is below a desired set point and a second stage wherein operation of a valve associated with increasing the compressor discharge pressure is controlled by the temperature of the airflow relative to the desired set point such that the compressor discharge pressure is maintained at a lowest value within an operating range of the compressor necessary to achieve the desired set point of the temperature of the air flow; and
a second evaporator having a refrigerant inlet and a refrigerant outlet and a refrigerant flow restrictor fluidly connected to the refrigerant inlet of the second evaporator and wherein the second evaporator is configured to dehumidify the supply airflow when the air treatment system is operated in a separate one of a dehumidification mode or a cooling mode.

* * * * *